US008559328B2

(12) United States Patent
Tan et al.

(10) Patent No.: US 8,559,328 B2
(45) Date of Patent: Oct. 15, 2013

(54) METHOD AND DEVICE FOR REPORTING CHANNEL STATE INFORMATION APERIODICALLY

(75) Inventors: Yuanchun Tan, Shenzhen (CN); Focai Peng, Shenzhen (CN); Liping Liu, Shenzhen (CN); Xianxi Li, Shenzhen (CN); Wei Lei, Shenzhen (CN); Hua Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 13/258,403

(22) PCT Filed: Nov. 30, 2009

(86) PCT No.: PCT/CN2009/075212
§ 371 (c)(1),
(2), (4) Date: Feb. 14, 2012

(87) PCT Pub. No.: WO2011/020258
PCT Pub. Date: Feb. 24, 2011

(65) Prior Publication Data
US 2012/0195213 A1      Aug. 2, 2012

(30) Foreign Application Priority Data

Aug. 19, 2009   (CN) .......................... 2009 1 0164900

(51) Int. Cl.
*G01R 31/08*          (2006.01)
(52) U.S. Cl.
USPC ........... 370/252; 370/241; 370/349; 370/392; 370/329; 370/332
(58) Field of Classification Search
USPC ......... 370/241, 252, 349, 392, 318, 319, 328, 370/329, 389, 332; 455/450, 434
See application file for complete search history.

(56) References Cited

U.S. PATENT DOCUMENTS 7,477,876 B2 * 1/2009 Das et al. .................. 455/67.13
8,041,308 B2 * 10/2011 Yun et al. ........................ 455/69
(Continued)

FOREIGN PATENT DOCUMENTS

CN          101064556 A    10/2007
JP          2005524330 A    8/2005
(Continued)

OTHER PUBLICATIONS

International Search Report in international application No. PCT/CN2009/075212, mailed on May 27, 2010.
(Continued)

*Primary Examiner* — Andrew Lai
*Assistant Examiner* — Andrew C Lee
(74) *Attorney, Agent, or Firm* — Oppedahl Patent Law Firm LLC (57) ABSTRACT

The disclosure discloses a method and device for reporting channel state information aperiodically. Wherein the method comprises: collecting the channel state information reported by the UE through the configured receiving window; determining the change speed degree of the channel state of the UE according to the criterion for determining a change speed of the channel state information; deciding whether the UE needs to perform aperiodic reporting according to the mapping relationship between the change speed degree of the channel state information and a reporting period adjusting value, and determining timing for the aperiodic reporting if needed. By the method of the disclosure, on one hand, the base station sufficiently obtains the channel state information reported by the UE, which benefits for more suitable scheduling and resource allocating for the UE; on the other hand, PUSCH resources can be used more rationally.

13 Claims, 4 Drawing Sheets

(56) References Cited

U.S. PATENT DOCUMENTS

| | | | |
|---|---|---|---|
| 2005/0245258 A1* | 11/2005 | Classon et al. | 455/434 |
| 2006/0094436 A1* | 5/2006 | Kim et al. | 455/450 |
| 2008/0057969 A1* | 3/2008 | Agami et al. | 455/450 |
| 2008/0101498 A1* | 5/2008 | Han et al. | 375/267 |
| 2008/0268785 A1 | 10/2008 | McCoy et al. | |
| 2009/0046569 A1* | 2/2009 | Chen et al. | 370/203 |
| 2009/0046805 A1* | 2/2009 | Kim et al. | 375/295 |
| 2009/0052405 A1* | 2/2009 | Ko et al. | 370/335 |
| 2009/0067391 A1* | 3/2009 | Shen et al. | 370/336 |
| 2009/0154588 A1* | 6/2009 | Chen et al. | 375/267 |
| 2009/0190528 A1* | 7/2009 | Chung et al. | 370/328 |
| 2009/0207784 A1* | 8/2009 | Lee et al. | 370/328 |
| 2009/0238256 A1* | 9/2009 | Onggosanusi et al. | 375/228 |
| 2009/0262854 A1* | 10/2009 | Lee et al. | 375/267 |
| 2010/0034093 A1* | 2/2010 | Roh | 370/241 |
| 2010/0034108 A1* | 2/2010 | Ode | 370/252 |
| 2010/0041390 A1* | 2/2010 | Chen et al. | 455/423 |

FOREIGN PATENT DOCUMENTS

| | | |
|---|---|---|
| JP | 2005525730 A | 8/2005 |
| JP | 2010537459 A | 12/2010 |
| WO | 2007004461 A1 | 1/2007 |
| WO | 2008137320 A1 | 11/2008 |
| WO | 2009000084 A1 | 12/2008 |
| WO | 2009088225 A2 | 7/2009 |

OTHER PUBLICATIONS

English Translation of the Written Opinion of the International Search Authority in international application No. PCT/CN2009/075212, mailed on May 27, 2010.
Technical Specification Group Radio Access Network Dec. 2008.
Supplementary European Search Report in European application No. 09848399.3, mailed on Dec. 14, 2012.

* cited by examiner

METHOD AND DEVICE FOR REPORTING CHANNEL STATE INFORMATION APERIODICALLY

TECHNICAL FIELD

The disclosure relates to Multi-Input and Multi-Output (MIMO) technologies, in particular to a method and device for reporting channel state information aperiodically.

BACKGROUND

In a wireless communication system, in order to improve the data transmission rate and the system throughput, MIMO technologies can be used. One or more data streams are transmitted via an MIMO channel in a manner capable of obtaining the largest system throughput of the system data transmission, which can reach excellent system performance. Simultaneously, a User Equipment (UE) may measure the MIMO channel and report channel state information to a base station. The channel state information comprises a Rank Indicator (RI), a Precoding Matrix Index (PMI), a Channel Quality Indicator (CQI) of each data stream and the like. The CQI of each data stream is may indicate a receiving Signal to Noise Ratio (SNR) and corresponding Coding Rate (CR) of the data stream.

In a Long Term Evolution (LTE) system, the manner of reporting channel state information by a UE comprises periodic reporting and aperiodic reporting.

Wherein, the periodic reporting is performed by the UE through a Physical Uplink Control Channel (PUCCH) or a Physical Uplink Shared Channel (PUSCH). Specifically, the reporting is performed by the PUCCH when the UE has no PUSCH resources at the periodic reporting time, and the reporting is performed by the PUSCH when the UE has PUSCH resources at the periodic reporting time. After the UE accesses to a base station, the base station may configure PUCCH resources and reporting period to the UE.

The aperiodic reporting is performed by the UE through the PUSCH. Reporting the channel state information through the PUSCH is divided into two situations: the channel state information may be multiplexed with UpLink Shared Channel (UL-SCH) data; and the channel state information (namely, without UL-SCH data) is reported independently. Currently, no specific scheme is provided concerning when the base station requires the UE to perform the aperiodic reporting, such that the base station cannot sufficiently obtain the channel state information reported by the UE; meanwhile, PUSCH resources cannot be rationally used.

SUMMARY

In light of the above, the main purpose of the disclosure is to provide a method and device for reporting channel state information aperiodically so that a base station can sufficiently obtain the channel state information reported by a UE and PUSCH resources can be used more rationally.

The disclosure provides a method for reporting channel state information aperiodically, which comprises: preconfiguring a type and length of a receiving window for channel state information required by a User Equipment (UE), a maximal reporting is period and a minimal reporting period of the channel state information, a criterion for determining a change speed of the channel state information, and a mapping relationship between the change speed degree of the channel state information and a reporting period adjusting value; the method further comprises:

collecting the channel state information reported by the UE through the configured receiving window; and determining the change speed degree of the channel state of the UE according to the criterion for determining a change speed of the channel state information; deciding whether the UE needs to perform aperiodic reporting according to the mapping relationship between the change speed degree of the channel state information and a reporting period adjusting value, and determining timing for the aperiodic reporting if needed.

The channel state information may comprise a Rank Indicator (RI), and/or a Precoding Matrix Index (PMI), and/or a Channel Quality Indicator (CQI) of each data stream;

the channel state information may correspond to one or a random combination of the RI, the PMI, and the CQI of each data stream according to different transmission modes;

according to different types of the channel state information, the receiving window for channel state information may comprise: one or a random combination of a CQI receiving window, a PMI receiving window, and an RI receiving window; and the length of the receiving window for channel state information may be a fixed length or times of a reporting period length fixed for receiving the channel state information.

The step of configuring the maximal reporting period and the minimal reporting period of the channel state information may be according to the type of the channel state information and comprise:

when the channel state information is the CQI of each data stream, setting the maximal reporting period of the CQI as a numerical value between 20 milliseconds and 50 milliseconds, and setting the minimal reporting period of the CQI as 2 milliseconds;

when the channel state information is the PMI, setting the maximal reporting period of the PMI as a numerical value between 20 milliseconds and 50 milliseconds, and setting the minimal reporting period of the PMI as 2 milliseconds; and when the channel state information is the RI, setting the maximal reporting period of the RI as a numerical value between 100 milliseconds and 500 milliseconds, and setting the minimal reporting period of the RI as 10 milliseconds.

The step of configuring the criterion for determining a change speed of the channel state information may comprise: dividing the channel state information change into fast, middle and slow grades according to a variance of the channel state information.

The step of configuring the mapping relationship between a change speed degree of the channel state information and a reporting period adjusting value may comprise: further dividing the fast or slow grade into subgrade when the channel state information change is in the fast or slow grade;

wherein the mapping relationship may be a corresponding relationship between the subgrade and the reporting period adjusting value.

The step of deciding whether the UE needs to perform aperiodic reporting and determining timing for the aperiodic reporting if needed may comprise:

a: determining whether the aperiodic reporting is needed according to the change speed degree of the channel state information;

b: when the aperiodic reporting is needed, adjusting the reporting period of the channel state information according to the fast or slow degree of the channel state information change; and c: determining the timing for the aperiodic reporting according to the adjusted reporting period of the channel state information.

Step a may comprise: dividing the channel state information change into fast, middle and slow grades according to the variance of the channel state information, performing the aperiodic reporting if the channel state information change is in the fast or slow grade; otherwise, performing no adjustment.

The method may further comprise: prior to step a, determining whether a reporting period of a Physical Uplink Control Channel (PUCCH) of each channel state information of the UE is smaller than or equal to the configured maximal reporting period of the channel state information one by one; if not, adjusting the aperiodic reporting according to the maximal reporting period of the channel state information.

Step b may comprise: when the aperiodic reporting is needed, determining the needed reporting period adjusting value from the mapping relationship between the change speed degree of the channel state information and the reporting period adjusting value according to the fast or slow degree of the channel state information change, and configuring a sum of the reporting period adjusting value and the current reporting period of the channel state information as the adjusted reporting period.

The method may further comprise:

if the adjusted reporting period is smaller than the configured minimal reporting period of the channel state information, configuring the adjusted reporting period value as the minimal reporting period of the channel state information; and if the adjusted reporting period is greater than the configured maximal reporting period of the channel state information, configuring the adjusted reporting period value as the maximal reporting period of the channel state information.

Step c may comprise:

firstly, determining a time number M of the aperiodic reporting required between two times of Physical Uplink Control Channel (PUCCH) reporting; wherein M is determined as a value which is obtained by dividing the PUCCH reporting period L by the adjusted reporting period T and then subtracting one after rounding; and then, determining an original point time for the aperiodic reporting between two times of PUCCH reporting, and determining an interval including front and back sides of is the original point time for the aperiodic reporting as a time range of the aperiodic reporting.

Step c may further comprise:

when UE has a plurality of channel state information to report, integrating the reporting period of each channel state information, combining reporting of those channel state information to an overlapping region, or if there is no overlapping, combining the time range of the aperiodic reporting of all the channel state information of which the reporting periods are not minimal, to the closest periodic reporting time or aperiodic reporting time range of channel state information with the minimal reporting period.

A device for reporting channel state information aperiodically comprises a main control unit, a channel state information collection unit, a channel state speed determination unit and an aperiodic reporting decision unit, wherein the main control unit is configured to configure a type and length of a receiving window for channel state information required by a User Equipment (UE), a maximal reporting period and a minimal reporting period of the channel state information, a criterion for determining a change speed of the channel state information, and a mapping relationship between the change speed degree of the channel state information and a reporting period adjusting value;

the channel state information collecting unit is configured to receive the configured type and length information of the receiving window required by the UE from the main control unit, store the channel state information reported in the receiving window for channel state information, and transmit the channel state information to the channel state speed determination unit;

the channel state speed determination unit is configured to receive the information about the criterion for determining the change speed of the channel state information from the main control unit, receive the channel state information of the UE from the channel state information collecting unit, determine the change speed degree of the channel state of the UE according to the criterion for determining the change speed of the channel state information, and transmit determined result information to the aperiodic reporting decision unit; and the aperiodic reporting decision unit is configured to receive, from the main control unit, the configured type and length of the receiving window for channel state information required by the UE, the maximal reporting period and the minimal reporting period of the channel state information, the mapping relationship between the change speed degree of the channel state information and the reporting period adjusting value, receive the determined result information of the speed degree from the channel state speed determination unit, decide whether the UE needs to perform aperiodic reporting and determine timing for the aperiodic reporting if needed.

The channel state information may comprise a Rank Indicator (RI), and/or a Precoding Matrix Index (PMI), and/or a Channel Quality Indicator (CQI) of each data stream;

the channel state information may correspond to one or a random combination of the RI, the PMI, and the CQI of each data stream according to different transmission modes;

according to different types of the channel state information, the receiving window for channel state information may comprise: one or a random combination of a CQI receiving window, a PMI receiving window, and an RI receiving window; and the length of the receiving window for channel state information may be a fixed length or times of a reporting period fixed for receiving the channel state information.

The aperiodic reporting decision unit may be specifically configured to determine whether it needs to perform the aperiodic reporting according to the determined result information of the speed degree received from the channel state speed determination unit, perform the aperiodic reporting when the speed degree in the determined result information is in a fast or slow grade; determine the reporting period adjusting value according to the mapping relationship between the change speed degree of the channel state information and the reporting period adjusting value after determining to perform the aperiodic reporting, and configure a sum of the reporting period adjusting value and the current reporting period of the channel state information as the adjusted reporting period; and the aperiodic reporting decision unit may be specifically configured to determine a time number of the aperiodic reporting between two times of Physical Uplink Control Channel (PUCCH) reporting according to a reporting period of the PUCCH and the adjusted reporting period of the channel state information; then determine an original point time for the aperiodic reporting required between two times of PUCCH reporting, and determine a time range for the aperiodic reporting required between two times of PUCCH reporting according to the original point time.

By the method and device for reporting channel state information aperiodically provided the disclosure, on one hand, a base station obtains the channel state information reported by a UE sufficiently, which benefits for more suitable scheduling and resource allocating for the UE; on the other hand, PUSCH resources can be used more rationally.

DETAILED DESCRIPTION

In order to make the purpose, technology schemes and advantages of the disclosure clearer, the disclosure will be further described in combination with the accompanying drawings.

Figure 1:
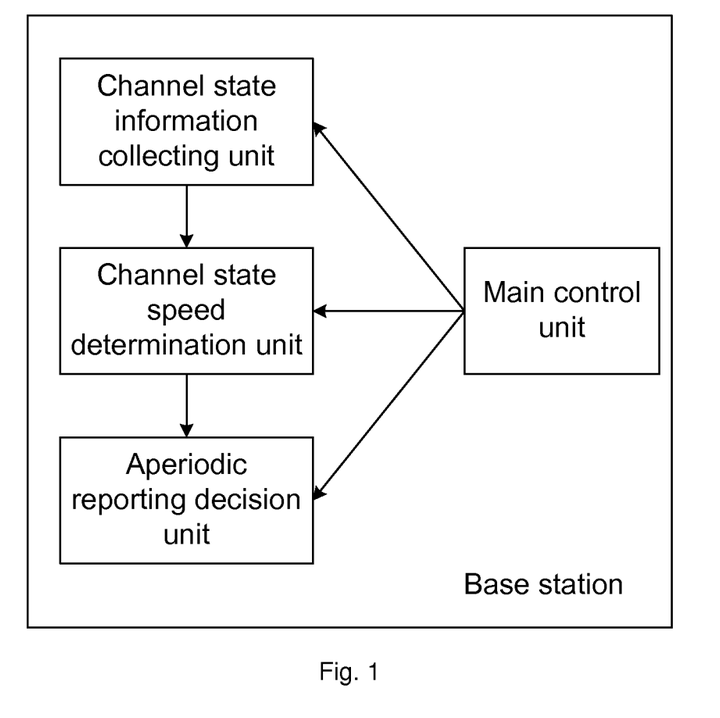
FIG. 1 is a forming structural diagram of a device for reporting channel state information aperiodically in the disclosure.

FIG. 1 is a forming structural diagram of a device for reporting channel state information aperiodically in the disclosure. As shown in FIG. 1, the device is located in a base station, and comprises:

a main control unit, which is configured to configure a type and length of a receiving window for channel state information required by a User Equipment (UE), a maximal reporting period and a minimal reporting period of the channel state information, a criterion for determining a change speed of the channel state information, a mapping relationship between the change speed degree of the channel state information and a reporting period adjusting value and the like information, and transmit the information to a channel state information collecting unit, a channel state speed determination unit and an aperiodic reporting decision unit respectively;

the channel state information collecting unit, which is configured to receive the configured the type and length of the receiving window required by the UE and the like information from the main control unit, store the channel state information reported in the configured receiving window, and transmit the channel state information to the channel state speed determination unit;

the channel state speed determination unit, which is configured to receive the criterion for determining the change speed of the channel state information and the like information from the main control unit, receive the channel state information of the UE from the channel state information collecting unit, determine the change speed degree of the channel state of the UE according to the criterion for determining the change speed of the channel state information, and transmit the determined result information of the speed degree to the aperiodic reporting decision unit; and the aperiodic reporting decision unit, which is configured to receive, from the main control unit, the configured type and length of the receiving window required by the UE, the maximal reporting period and the minimal reporting period of the channel state information, the mapping relationship between the change speed degree of the channel state information and the reporting period adjusting value and the like information, receive the determined result information of the speed degree from the channel state speed determination unit, decide whether the UE needs to perform aperiodic reporting according to the received information and determine timing for the aperiodic reporting if needed.

Figure 2:
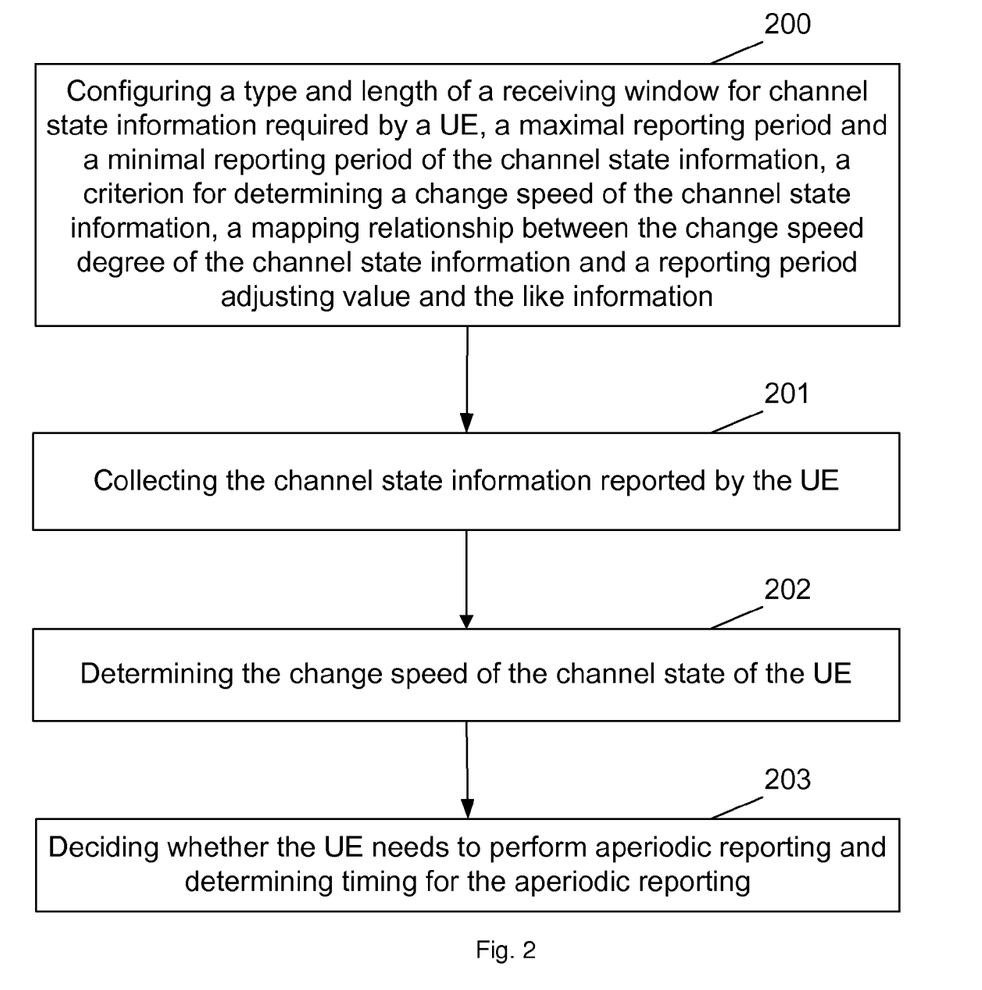
FIG. 2 is a flowchart of a method for reporting channel state information aperiodically in the disclosure.

FIG. 2 is a flowchart of a method for reporting channel state information aperiodically in the disclosure, as shown in FIG. 2, it comprises the following steps.

Step 200: configuring a type and length of a receiving window for channel state information required by a UE, a maximal reporting period and a minimal reporting period of the channel state information, a criterion for determining a change speed of the channel state information, a mapping relationship between the change speed degree of the channel state information and a reporting period adjusting value and the like information.

Step 201: collecting the channel state information reported by the UE.

Step 202: determining the change speed of the channel state of the UE.

Step 203: deciding whether the UE needs to perform aperiodic reporting and determining timing for the aperiodic reporting if needed.

Up to now, the whole flow of realizing the method for reporting channel state information aperiodically is completed.

In a communication network, different receiving windows are used for different types of channel state information. The type and length of the receiving window for channel state information are configured in step 200. In an LTE system, according to different types of channel state information, the receiving window for channel state information is divided into: a Rank Indicator (RI) receiving window, a Precoding Matrix Index (PMI) receiving window and a Channel Quality Indicator (CQI) receiving window.

The channel state information reported by the UE in different transmission modes may be different, specifically:

(1) UE is only required for reporting CQI information in transmission mode 1 (namely, a single antenna emission and transmission mode), transmission mode 2 (namely, an emission diversity transmission mode) and transmission mode 7 (namely, a shaped-beam transmission mode);

(2) UE is required for reporting RI and CQI information in transmission mode 3 (namely, a large delay Cyclic Delay Diversity (CDD) transmission mode);

(3) UE is required for reporting RI, PMI and CQI information in transmission mode 4 (namely, a closed-loop space multiplexing transmission mode);

(4) UE is required for reporting PMI and CQI information in transmission mode 5 (namely, a multi-user MIMO transmission mode) and transmission mode 6 (namely, the closed-loop space multiplexing transmission mode with 1 as the rank).

Therefore, from the above, different transmission modes correspond to one or combinations of the RI, PMI, and CQI information. Accordingly, different transmission modes need different receiving windows for channel state information, that is to say, the receiving window may be one or combinations of an RI receiving window, a PMI receiving window and a CQI receiving window corresponding to different transmission modes. It should be noted that the periodic reporting of CQI and PMI information, if needed, should be performed simultaneously in the LTE system.

Meanwhile, in the LTE system, different receiving windows for channel state information have different lengths. The length of the receiving window may be set as a fixed length, or may be set in the manner as times of a fixed reporting period for receiving the channel state information.

For example, the length of the CQI receiving window may be set as 100 ms or 10 times of the CQI reporting period.

When configuring the maximal reporting period and the minimal reporting period of the channel state information in step 200, a lowest sampling frequency Fmin (namely, the maximal reporting period Tmax) of the channel state information in the receiving window for channel state information should be set. Different types of the channel state information have different maximal reporting periods Tmax, for example:

the maximal reporting period of CQI is Tcqimax, and the value range of Tcqimax is from 20 ms to 50 ms usually;

the maximal reporting period of PMI is Tpmimax, and the value range of Tpmimax is from 20 ms to 50 ms usually; and the maximal reporting period of RI is Trimax, and the value range of Trimax is from 100 ms to 500 ms usually.

During configuration, the maximal sampling frequency Fmax (namely, the minimal reporting period Tmin) of the channel state information in the receiving window for channel state information should be set. Different types of the channel state information have different minimal reporting periods Tmin, for example:

the minimal reporting period of CQI is Tcqimin, and the value of Tcqimin is 2 ms;

the minimal reporting period of PMI is Tpmimin, and the value of Tpmimin is 2 ms; and the minimal reporting period of RI is Trimin, and the value of Trimin is 10 ms.

The criterion for grading the change speed degree of each item of channel state information configured in step 200 is divided into fast, middle and slow grades according to the change of the channel state information:

when determining that the channel state information change is fast, the sampling frequency of the channel state information is increased by increasing the aperiodic reporting;

when determining that the channel state information change is slow, the sampling frequency of the channel state information is decreased by reducing the aperiodic reporting; and when determining that the channel state information change is in the middle grade, the current sampling frequency of the channel state information is maintained.

A variance may be used for measuring in determining the channel state information change. Of course, it is not limited to this. Table 1 denotes the determining criterion of fast, middle and slow CQI information change.

TABLE 1

| Variance of wideband CQI in CQI receiving window (Vcqi) | The change grade of wideband CQI |
|---|---|
| Vcqi < 1 | slow |
| 1 <= Vcqi < 3 | middle |
| 3 <= Vcqi | fast |

As shown in Table 1, it should be noted that the value ranges of RI and PMI information are different with different parameter configurations. For example, when the emitting antenna number of the base station is 2 and the receiving antenna number of the UE is 2, the value of the RI reported by the UE is 1 or 2; and for example, when the emitting antenna number of the base station is 4 and the receiving antenna number of the UE is 4, the value of the RI reported by the UE is 1, 2, 3 or 4. When the value ranges of the RI and PMI information are different, the determining criterion of fast, middle and slow change may be different.

Further, as an optimization to the channel state information change, the fast change grade of each item of channel state information is further divided and is associated with the sampling frequency of the channel state information. Namely, reporting period adjustment is performed according to the different fast degree of channel state information change. The faster the channel state information change is, the greater the adjusting strength of the channel state information reporting period is, the weaker the contrast. Table 2 denotes a corresponding relationship of the CQI variance within the CQI receiving window and the CQI reporting period adjusting value, wherein the reporting period of the CQI at the current time is taken as Tcqiold.

TABLE 2

| Variance of wideband CQI in CQI receiving window (Vwidebandcqi) | The reporting period adjusting value of the wideband CQI |
|---|---|
| 3 <= Vcqi < 4 | −Tcqiold/2 |
| 4 <= Vcqi < 6 | −2Tcqiold/3 |
| 6 <= Vcqi | −3Tcqiold/4 |

In Table 2, Tcqiold is the reporting period of the current wideband CQI. Of course, Table 2 is only an embodiment, and the detailed description is not limited to this.

Further, as an optimization to the channel state information change, the slow change grade of channel state information is further divided and is associated with the sampling frequency of the channel state information. Namely, reporting period adjustment is performed according to the different slow change degree of channel state information. The slower the channel state information change is, the weaker the adjusting strength of the channel state information reporting period is, the greater the contrast. Table 3 denotes a corresponding relationship of the CQI variance within the CQI receiving window and the CQI reporting period adjusting value, wherein the reporting period of the CQI at the current time is taken as Tcqiold.

TABLE 3

| Variance of wideband CQI in CQI receiving window (Vcqi) | The reporting period adjusting value of the wideband CQI |
|---|---|
| 0.5 <= Vcqi < 1 | Tcqiold/3 |
| 0.1 <= Vcqi < 0.5 | Tcqiold/2 |
| Vcqi < 0.1 | Tcqiold |

In Table 3, Tcqiold is the reporting period of the current wideband CQI. Of course, Table 3 is only an embodiment, and the detailed description is not limited to this.

Figure 3:
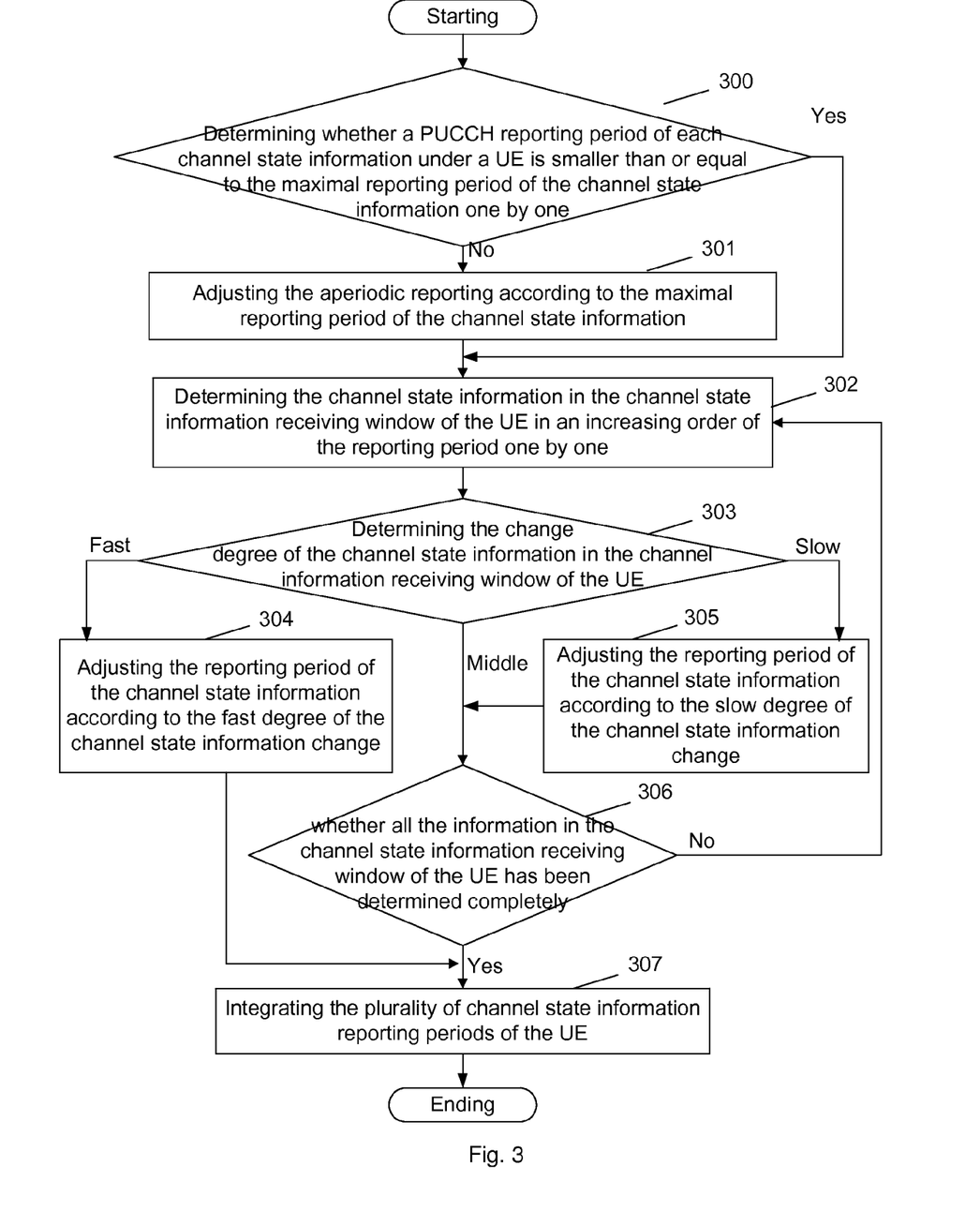
FIG. 3 is a processing flowchart of an aperiodic reporting decision unit when aperiodically reporting channel state information in the disclosure.

FIG. 3 is a processing flowchart of an aperiodic reporting decision unit when aperiodically reporting channel state information in the disclosure, as shown in FIG. 3, the flow comprises the following steps.

Step 300: determining whether a PUCCH reporting period of each channel state information under a UE is smaller than or equal to the maximal reporting period of the channel state information one by one; if not, forwarding to step 301; if yes, forwarding to step 302.

Step 301: adjusting an aperiodic reporting according to the maximal reporting period of the channel state information.

Steps 302-303: determining for the channel state information in the receiving window for channel state information of the UE in an increasing order of the reporting period one by one; determining the change degree of the channel state information in a certain channel information receiving window of the UE, if determining the change grade is fast, forwarding to step 304, if determining the change grade is middle, forwarding to step 306, and if determining the change grade is slow, forwarding to step 305.

Step 304: adjusting the reporting period of the channel state information according to the fast degree of the channel state information change, and forwarding to step 307.

Step 305: adjusting the reporting period of the channel state information according to the slow degree of the channel state information change.

Step 306: further determining whether all the information in the channel state information receiving window of the UE has been determined completely; if yes, forwarding to step 307; if not, returning to step 302.

Step 307: integrating the plurality of channel state information reporting periods of the UE.

Further, a specific method for adjusting the reporting period of each item of channel state information is realized as follows:

for certain channel state information, the reporting period adjusting value (assuming that it is represented by deltaT) corresponding to the degree of the channel state information change (such as fast, middle or slow) is directly added with the current reporting period (assuming that it is represented by Told) of the channel state information, namely, Tnew=Told+deltaT, wherein Tnew is the reporting period after adjustment. It should be noted that Tnew is configured to be the minimal reporting period of the channel state information when Tnew is smaller than the minimal reporting period of the channel state information; and Tnew is configured to be the maximal reporting period of the channel state information when Tnew is greater than the maximal reporting period of the channel state information.

Further, after determining the new reporting period of each item of channel state information, the aperiodic reporting is adjusted with the following method:

assuming that a period of reporting certain channel state information through a PUCCH is L milliseconds, and a reporting period of the channel state information is T milliseconds (T is an value of the channel state information after adjustment during the TTI), specifically comprising:

firstly, calculating a time number M of the aperiodic reporting required between two times of PUCCH reporting, wherein M is the value obtained by dividing L by T and then subtracting one after rounding;

then, determining an original point time of the aperiodic reporting required between two times of PUCCH reporting, wherein the principle for determining the original point time of the aperiodic reporting is to try to distribute the aperiodically reporting original point between two times of PUCCH reporting evenly. One determining embodiment is to determine the original points of the first M−1 times of aperiodic reporting according to a step size of T milliseconds starting from the first PUCCH reporting time one by one. The original point of the last time of aperiodic reporting is the midpoint between the original point of the (M−1)$^{th}$ aperiodic reporting and the second PUCCH reporting time; and determining the time range for aperiodic reporting required between two times of PUCCH reporting, wherein the time range of the aperiodic reporting is near the original point time of the aperiodic reporting. For example, when T is greater than or equal to 4 milliseconds, the time of which the interval with the original point time of the aperiodic reporting is floor (T/4) and [−floor (T/4)] is configured within the time range, wherein the function floor ( ) denotes rounding down. And for example, when T is smaller than 4 milliseconds, the time range of the aperiodic reporting is the original point time of the aperiodic reporting. It should be noted that the original point of the last aperiodic reporting may be between two discrete time points, in this case either of the two discrete time points may be used.

When there are a plurality of channel state information to report by the UE, the reporting period of each channel state information may be integrated, specifically: when overlapping exists in the time range of the aperiodic reporting of different channel state information, combining reporting of them to an overlapping region, and even if there is no overlapping, combining the time range of the aperiodic reporting of all the reported channel state information of which the reporting periods are not minimal, to the closest periodic reporting time or aperiodic reporting time range of channel state information with the minimal reporting period.

After adjusting the reporting period of the channel state information of the UE each time, all the channel state information receiving windows under the UE are performed with reset processing and receive the adjusted channel state information again. It should be noted that, when the channel state information receiving window is not full, no adjusting process of the reporting period is performed.

Besides, the CQI may be divided into a wideband CQI and a subband CQI. In the CQI information periodically reported by the PUCCH, the frequency of the wideband CQI reporting is smaller than the frequency of the subband CQI reporting. The wideband CQI is the CQI over the whole bandwidth, while the subband CQI is the CQI over a certain part of the bandwidth. The change of the wideband CQI is mainly considered, and the change of the subband CQI may serve as a complement.

The method in the disclosure is described in details in combination with embodiments.

In embodiment 1, assuming that a UE uses transmission mode 1 for transmission, only a wideband CQI is reported. The period of the wideband CQI reported by a PCCH is Lcqi=10 ms.

Firstly, the UE is configured with a CQI receiving window, assuming that configured parameters of the CQI receiving window are: the length of the CQI receiving window is 100 ms, Tcqimax is 20 ms, and Tcqimin is 2 ms. The criterion for determining the CQI change speed is shown in Table 1. The mapping relationship between the fast degree of CQI change and the adjusting value of the CQI reporting period is shown in Table 2. The mapping relationship between the slow degree of CQI change and the adjusting value of the CQI reporting period is shown in Table 3.

Next, it is determined that the PUCCH reporting period is 10 ms that is smaller than Tcqimax, so it does not need to adjust the aperiodic reporting according to Tcqimax of the channel state information.

Figure 4:
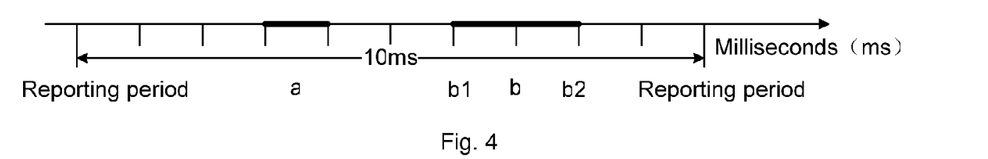
FIG. 4 is a diagram in embodiment 1 when aperiodically reporting channel state information in the disclosure.

And then, the channel state information CQI in the channel state information receiving window under the UE is determined in an increasing order of the reporting period one by one:

a) Assuming that, at a certain time, the CQI in the CQI receiving window of the UE is 10, 8, 9, 6, 12, 5, 8, 10, 9 and 13 orderly, the variance of CQI at the time is calculated as 5.4, determining the CQI change of the UE as fast through Table 1, and determining that the adjusting value of the CQI reporting period of the UE as deltaTcqi=−2Tcqiold/3 through Table 2.

b) The reporting period of the current CQI is Tcqiold=10 ms, so the adjusted reporting period is: Tcqinew=Tcqiold+deltaTcqi=Tcqiold−2Tcqiold/3=Tcqiold/3, and Tcqinew belongs to [Tcqimin, Tcqimax].

c) Calculating a time number M of the CQI aperiodic reporting required between two times of PUCCH reporting, wherein the value of M is 2 which is obtained by dividing L by T and subtracting one after rounding.

d) Determining an original point time of the CQI aperiodic reporting required between two times of PUCCH reporting, such as points a and b in FIG. 4, wherein FIG. 4 is a diagram in embodiment 1 when aperiodically reporting channel state information in the disclosure, and in FIG. 4, the reporting period is Tcqiold=10 ms, and the axis unit is milliseconds (ms).

e) Determining the time range of the CQI aperiodic reporting required between two times of PUCCH reporting. Because Tcqinew is less than 4 ms, the time range of the CQI aperiodic reporting is the original point time of the aperiodic reporting. As shown in FIG. 4, since point b is between two time points b1 and b2, it may be reported at time point b1 or b2.

f) the CQI receiving window is performed with reset processing.

Based on embodiment 1, if it is a subband CQI, it only needs to consider the CQI on a certain part of bandwidth. The specific realization is similar to the processing manner of embodiment 1, which is not described in details herein.

Embodiment 2, assuming that the cell transmission antenna number is 2, the UE receiving antenna number is 2. The UE uses transmission mode 3 for transmission, with RI and CQI information for reporting. The period for reporting CQI by the PUCCH is Lcqi=10 ms, and the period for reporting RI by the PUCCH is Lri=20 ms.

Firstly, the UE is configured with the RI receiving window and the CQI receiving window, assuming that configuration parameters of the CQI receiving window are: the length of the CQI receiving window is 100 ms, Tcqimax is 20 ms, and Tcqimin is 2 ms; configuration parameters of the RI receiving window are: the length of the RI receiving window is 100 ms, Trimax is 20 ms, and Trimin is 5 ms.

The criterion for determining the CQI change speed is shown in Table 1. The mapping relationship between the fast degree of CQI change and the adjusting value of the CQI reporting period is shown in Table 2. The mapping relationship between the slow degree of CQI change and the adjusting value of the CQI reporting period is shown in Table 3. The criterion for determining the RI change speed is shown in Table 4.

TABLE 4

| RI variance in the RI receiving window (Vri) | The change grade of the RI |
|---|---|
| Vri < 0.1 | slow |
| 0.1 <= Vri < 0.2 | middle |
| 0.2 <= Vri | fast |

The mapping relationship between the fast degree of RI change and the adjusting value of the RI reporting period is shown in Table 5.

TABLE 5

| RI variance in the RI receiving window (Vri) | The adjusting value of the RI reporting period |
|---|---|
| 0.2 <= Vri < 0.3 | −Triold/2 |
| 0.3 <= Vri < 0.4 | −2Triold/3 |
| 0.4 <= Vri | −3Triold/4 |

The mapping relationship between the RI change slow degree and the RI reporting period adjusting value is shown in Table 6.

TABLE 6

| RI variance in the RI receiving window (Vri) | The adjusting value of the RI reporting period |
|---|---|
| 0.05 <= Vri < 0.1 | Triold/3 |
| 0.01 <= Vri < 0.05 | Triold/2 |
| Vri < 0.01 | Triold |

Next, since the period for reporting the CQI by the PUCCH is determined as 10 ms which is smaller than Tcqimax, it does not need to adjust the aperiodic reporting of the CQI according to Tcqimax; since the period for reporting the RI by the PUCCH is determined as 20 ms which is equal to Trimax, it does not need to adjust the aperiodic reporting of the RI according to Trimax.

And then, the channel state information CQI and RI in the channel state information receiving window under the UE are determined one by one in an increasing order of the reporting period.

Figure 5:
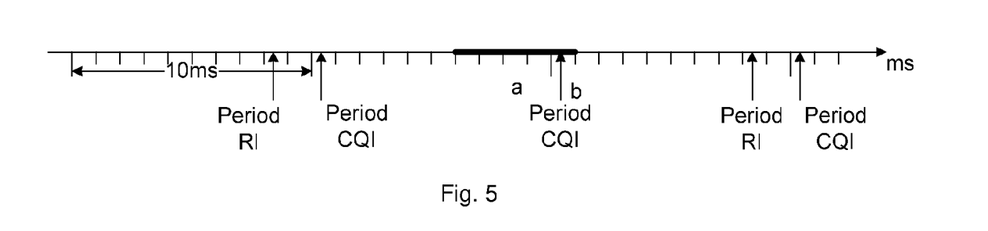
FIG. 5 is a diagram in embodiment 2 when aperiodically reporting channel state information in the disclosure.

Wherein, the step of determining the CQI comprises: assuming that the CQI in the CQI receiving window of the UE at a certain time is sequentially: 10, 10, 11, 8, 10, 9, 8, 10, 9 and 11; calculating the variance of CQI at the time as 1.04, determining that the CQI speed degree of the UE as middle through Table 1, wherein the CQI reporting period of the UE needs no adjustment.

the step of determining the RI comprises:

a) Assuming that the RI in the RI receiving window of the UE at the time is sequentially: 1, 1, 1, 2 and 2; calculating the variance of RI at the time as 0.24, determining that the RI change of the UE is fast through Table 4, and determining that the adjusting value of the RI reporting period of the UE as deltaTri=−Triold/2 through Table 5.

b) Since the reporting period of the current RI is Triold=20 ms, so the adjusted reporting period is Trinew=Triold+deltaTri=Triold−Triold/2=Triold/2, and Trinew belongs to [Trimin, Trimax].

c) Calculating a time number Mri of the RI aperiodic reporting required between two times of PUCCH reporting, wherein the value of Mri is 1 which is obtained by dividing Lri by Tri and subtracting one after rounding.

d) Determining an original point time of the RI aperiodic reporting required between two times of PUCCH reporting, such as point a in FIG. 5, wherein FIG. 5 is a diagram in embodiment 2 when aperiodically reporting channel state information in the disclosure.

e) Determining the time range of the RI aperiodic reporting required between two times of PUCCH reporting, since Trinew is greater than 4 ms, floor(Trinew/4)=2, [−floor(Trinew/4)]=−2, as shown in FIG. 5, the time range of the RI aperiodic reporting is the time of which the interval with the original point time a of the aperiodic reporting is 2 ms or −2 ms.

f) Since there are RI and CQI channel state information to report in the UE, the RI and CQI channel state information reporting periods of the UE are integrated. The time range of the RI aperiodic reporting is overlapped with the time range of the CQI periodic reporting, namely at point b, as shown in FIG. 5, so aperiodic reporting is performed at point b.

g) RI receiving window is performed with reset processing.

Base on embodiment 2, if the time range of the RI aperiodic reporting and the CQI periodic reporting are not overlapped, and the reporting period of the RI is smaller than the reporting period of the CQI, then the time range of the aperiodic reporting of all the reported channel state information of which the reporting periods are not minimal, is combined to the closest periodic reporting time or aperiodic reporting time range of channel state information with the minimal reporting period. Namely, the aperiodic reporting time of the CQI is combined to the periodic reporting time or the aperiodic reporting time range of the RI.

The above is only embodiments of the disclosure and not intended to limit the disclosure. The disclosure may have various modifications and changes for the technicians in the field, and any modifications, equivalent replacements, improvements and the like within the spirit and principle of the disclosure shall fall within the scope of protection of the claims of the disclosure.

The invention claimed is:

1. A method for reporting channel state information aperiodically, comprising: preconfiguring a type and length of a receiving window for channel state information required by a User Equipment (UE), a maximal reporting period and a minimal reporting period of the channel state information, a criterion for determining a change speed of the channel state information, and a mapping relationship between the change speed degree of the channel state information and a reporting period adjusting value; the method further comprising:
collecting the channel state information reported by the UE through the configured receiving window; and
determining the change speed degree of the channel state of the UE according to the criterion for determining a change speed of the channel state information; deciding whether the UE needs to perform aperiodic reporting according to the mapping relationship between the change speed degree of the channel state information and a reporting period adjusting value, and determining timing for the aperiodic reporting if needed, wherein the step of preconfiguring the maximal reporting period and the minimal reporting period of the channel state information is according to the type of the channel state information and comprises: when the channel state information is a Channel Quality Indicator (CQI) of each data stream, setting the maximal reporting period of the CQI as a numerical value between 20 milliseconds and 50 milliseconds, and setting the minimal reporting period of the CQI as 2 milliseconds; when the channel state information is a Precoding Matrix Index (PMI), setting the maximal reporting period of the PMI as a numerical value between 20 milliseconds and 50 milliseconds, and setting the minimal reporting period of the PMI as 2 milliseconds; and when the channel state information is the RI, setting the maximal reporting period of the RI as a numerical value between 100 milliseconds and 500 milliseconds, and setting the minimal reporting period of the RI as 10 milliseconds.

2. The method according to claim 1, wherein the channel state information comprises at least one of a Rank Indicator (RI), a Precoding Matrix Index (PMI), and a Channel Quality Indicator (CQI) of each data stream;
the channel state information corresponds to one or a random combination of the RI, the PMI, and the CQI of each data stream according to different transmission modes;
according to different types of the channel state information, the receiving window for channel state information comprises: one or a random combination of a CQI receiving window, a PMI receiving window, and an RI receiving window; and
the length of the receiving window for channel state information is a fixed length or times of a reporting period length fixed for receiving the channel state information.

3. The method according to claim 1, wherein the step of configuring the criterion for determining a change speed of the channel state information comprises: dividing the channel state information change into fast, middle and slow grades according to a variance of the channel state information.

4. The method according to claim 3, wherein the step of configuring the mapping relationship between a change speed degree of the channel state information and a reporting period adjusting value comprises: further dividing the fast or slow grade into subgrade when the channel state information change is in the fast or slow grade;
wherein the mapping relationship is a corresponding relationship between the subgrade and the reporting period adjusting value.

5. The method according to claim 1, wherein the step of deciding whether the UE needs to perform aperiodic reporting and determining timing for the aperiodic reporting if needed comprises:
a: determining whether the aperiodic reporting is needed according to the change speed degree of the channel state information;
b: when the aperiodic reporting is needed, adjusting the reporting period of the channel state information according to the fast or slow degree of the channel state information change; and
c: determining the timing for the aperiodic reporting according to the adjusted reporting period of the channel state information.

6. The method according to claim 5, wherein step a comprises: dividing the channel state information change into fast, middle and slow grades according to the variance of the channel state information, performing the aperiodic reporting if the channel state information change is in the fast or slow grade; otherwise, performing no adjustment.

7. The method according to claim 6, wherein the method further comprises: prior to step a, determining whether a reporting period of a Physical Uplink Control Channel (PUCCH) of each channel state information of the UE is smaller than or equal to the configured maximal reporting period of the channel state information one by one; if not, adjusting the aperiodic reporting according to the maximal reporting period of the channel state information.

8. The method according to claim 6, wherein step b comprises: when the aperiodic reporting is needed, determining the needed reporting period adjusting value from the mapping relationship between the change speed degree of the channel state information and the reporting period adjusting value according to the fast or slow degree of the channel state information change, and configuring a sum of the reporting period adjusting value and the current reporting period of the channel state information as the adjusted reporting period.

9. The method according to claim 8, wherein the method further comprises:
if the adjusted reporting period is smaller than the configured minimal reporting period of the channel state information, configuring the adjusted reporting period value as the minimal reporting period of the channel state information; and
if the adjusted reporting period is greater than the configured maximal reporting period of the channel state information, configuring the adjusted reporting period value as the maximal reporting period of the channel state information.

10. The method according to claim 9, wherein step c comprises:

firstly, determining a time number M of the aperiodic reporting required between two times of Physical Uplink Control Channel (PUCCH) reporting; wherein M is determined as a value which is obtained by dividing the PUCCH reporting period L by the adjusted reporting period T and then subtracting one after rounding; and then, determining an original point time for the aperiodic reporting required between two times of PUCCH reporting, and determine an interval including front and back sides of the original point time for the aperiodic reporting as a time range of the aperiodic reporting.

11. The method according to claim 10, wherein step c further comprises:

when UE has a plurality of channel state information to report, integrating the reporting period of each channel state information, combining reporting of those channel state information to an overlapping region, or if there is no overlapping, combining the time range of the aperiodic reporting of all the channel state information of which the reporting periods are not minimal, to the closest periodic reporting time or aperiodic reporting time range of channel state information with the minimal reporting period.

12. A device for reporting channel state information aperiodically, comprising a main control unit, a channel state information collection unit, a channel state speed determination unit and an aperiodic reporting decision unit, wherein the main control unit is configured to configure a type and length of a receiving window for channel state information required by a User Equipment (UE), a maximal reporting period and a minimal reporting period of the channel state information, a criterion for determining a change speed of the channel state information, and a mapping relationship between the change speed degree of the channel state information and a reporting period adjusting value; the channel state information collecting unit is configured to receive the configured type and length information of the receiving window required by the UE from the main control unit, store the channel state information reported in the receiving window for channel state information, and transmit the channel state information to the channel state speed determination unit;

the channel state speed determination unit is configured to receive the criterion information for determining the change speed of the channel state information from the main control unit, receive the channel state information of the UE from the channel state information collecting unit, determine the change speed degree of the channel state of the UE according to the criterion for determining the change speed of the channel state information, and transmit determined result information to the aperiodic reporting decision unit; and the aperiodic reporting decision unit is configured to receive, from the main control unit, the configured type and length of the receiving window required by the UE, the maximal reporting period and the minimal reporting period of the channel state information, the mapping relationship between the change speed degree of the channel state information and the reporting period adjusting value, receive the determined result information of the speed degree from the channel state speed determination unit, decide whether the UE needs to perform aperiodic reporting and determine timing for the aperiodic reporting if needed, wherein the aperiodic reporting decision unit is specifically configured to determine whether it needs to perform the aperiodic reporting according to the determined result information of the speed degree received from the channel state speed determination unit, perform the aperiodic reporting when the speed degree in the determined result information is in a fast or slow grade; determine the reporting period adjusting value according to the mapping relationship between the change speed degree of the channel state information and the reporting period adjusting value after determining to perform the aperiodic reporting, and configure a sum of the reporting period adjusting value and the current reporting period of the channel state information as the adjusted reporting period; and the aperiodic reporting decision unit is specifically configured to determine a time number of the aperiodic reporting between two times of Physical Uplink Control Channel (PUCCH) reporting according to a reporting period of the PUCCH and the adjusted reporting period of the channel state information; then determine an original point time for the aperiodic reporting required between two times of PUCCH reporting, and determine a time range for the aperiodic reporting required between two times of PUCCH reporting according to the original point time.

13. The device according to claim 12, wherein the channel state information comprises at least one of a Rank Indicator (RI), a Precoding Matrix Index (PMI), and a Channel Quality Indicator (CQI) of each data stream;

the channel state information corresponds to one or a random combination of the RI, the PMI, and the CQI of each data stream according to different transmission modes;

according to different types of the channel state information, the receiving window for channel state information comprises: one or a random combination of a CQI receiving window, a PMI receiving window, and an RI receiving window; and the length of the receiving window for channel state information is a fixed length or times of a reporting period fixed for receiving the channel state information.

* * * * *

UNITED STATES PATENT AND TRADEMARK OFFICE
CERTIFICATE OF CORRECTION

PATENT NO.        : 8,559,328 B2                                              Page 1 of 1
APPLICATION NO. : 13/258403
DATED             : October 15, 2013
INVENTOR(S)       : Tan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Fifteenth Day of September, 2015

Michelle K. Lee
*Director of the United States Patent and Trademark Office*